United States Patent [19]

Billings

[11] Patent Number: 4,816,280

[45] Date of Patent: Mar. 28, 1989

[54] MALT BEVERAGES WITH IMPROVED FLAVOR AND METHOD OF MAKING SAME

[75] Inventor: John H. Billings, Detroit, Mich.

[73] Assignee: The Stroh Brewery Company, Detroit, Mich.

[21] Appl. No.: 712,893

[22] Filed: Mar. 18, 1985

[51] Int. Cl.$^4$ .............................................. C12G 3/06
[52] U.S. Cl. ...................................... 426/548; 426/592
[58] Field of Search .................... 426/11, 16, 29, 548, 426/592, 330.3, 330.4

[56] References Cited

U.S. PATENT DOCUMENTS

| | | | |
|---|---|---|---|
| 3,800,046 | 3/1974 | Schlatter | 426/168 |
| 4,021,580 | 5/1977 | Raymond et al. | 426/592 |

FOREIGN PATENT DOCUMENTS

| | | | |
|---|---|---|---|
| 201351 | 5/1986 | Czechoslovakia . | |
| 1152977 | 5/1969 | United Kingdom . | |
| 1418087 | 12/1975 | United Kingdom . | |
| 1506220 | 4/1978 | United Kingdom . | |
| 2087426 | 5/1982 | United Kingdom | 426/592 |

OTHER PUBLICATIONS

Anon. 1982, the Nutra Sweet Breakthrough, G. D. Searle & Co.
Moll, 1981, Prediction of the Organoleptic Quality of Beer in the Quality of Foods and Beverages, Academic Press, Inc., pp. 148–166.
Broderick et al., 1978, the Practical Brewer Second Edition, pp. 300–309 and 440–441, Master Brewers Assn.
European Brewery Convention Thesaurus, vol. 1, 1982, IRL Press Ltd., Oxford U.K., pp. VI and VII.
Clapperton et al., 1975, MBAA Technical Quarterly, vol. 12(4), pp. 273–280.

*Primary Examiner*—Donald E. Czaja
*Assistant Examiner*—Carolyn Paden
*Attorney, Agent, or Firm*—Barnes, Kisselle, Raisch, Choate, Whittemore & Hulbert

[57] ABSTRACT

A malt beverage comprising a fermentation product made from water, malt, hops, yeast and containing Aspartame, with or without minor constituents such as water treatment salts, yeast food, etc. The concentration of Aspartame is between 4 and 450 ppm (weight/volume) of the final product, and preferably is between 4 and 20 ppm (weight/volume) of the final product. The malt beverage containing Aspartame is made by a method comprising the addition of Aspartame to the malt beverage at least after the boiling operation, and preferably after final filtration of the beverage.

11 Claims, No Drawings

MALT BEVERAGES WITH IMPROVED FLAVOR AND METHOD OF MAKING SAME

This invention relates to flavor improvements in certain malt-based beverages and to a method of improving the flavor of such beverages.

BACKGROUND OF THE INVENTION

Malt beverages, being fermented, contain carbohydrates, but only traces of sugars, and sweetness is not a predominant flavor. Certain malt beverages, for reasons of their intended market segment, require added smoothness and fullness. Such added flavor cannot be provided by the known means of arresting the fermentation and/or by the addition of priming sugars, for example, because the complete beverage would then be too high in sugars or in calories, or because such procedures are not considered good brewing practice in a modern context of microbial sanitation. The use of priming sugars, e.g. the dosing of finished beer with small amounts of dextrose or corn syrup, has historically been the procedure by which beer flavor could be smoothed and sweetened. However, this procedure carries the risk of causing bacteriological problems by introducing fermentable carbohydrates into an area of the brewery where finished beer quality can be damaged inadvertently by microorganisms. The use of Aspartame has not been previously described in malt beverages, although it is well known in diet soft drinks; see, for example, U.S. Pat. Nos. 3,475,403 and 3,492,131.

Accordingly, it is the basic object of this invention to improve the fullness and flavor of malt beverages without adding calories or significant cost and in a safe and reliable manner.

It is a further object of this invention to improve the flavor of certain malt beverages having a degree of fermentation (attenuation), either lower or higher than that of normally fermented beer, such as low caloric, low alcohol products, non-alcoholic malt beverages, fruit-flavored malt beverages or the like.

It is a further and specific object of this invention to improve the smoothness of malt beverages, be they deficient in this attribute because of a higher alcohol to extract ratio (e.g. a high degree of fermentation) than normal lager beers, or because of age, or because of a combination of causes.

Other objects, features and advantages of the present invention will become apparent from the following summary and detailed description of the invention, and from the appended claims.

SUMMARY OF THE INVENTION

The incorporation of small amounts of Aspartame, L-alpha-aspartyl-L-phenylalanine methyl ester, in malt beverages was found to increase sweetness above threshold levels as expected. Such incorporation unexpectedly also improved the fullness and flavor balance of certain malt beverages even below the threshold level for sweetness, for example, of those beer types which are low in calories (so-called "Light Beers"), and also of beer types which are low in alcohol, i.e., of malt beverages which have a degree of attenuation which is either higher or lower than that of regular beer or ale.

It was noted that a beer type recently developed for those desiring less than normal alcohol was dull and lacking in flavor balance. Such beers were high in unfermented carbohydrates, so it was not a matter of "body" or mouth sensation. It was discovered that Aspartame not only improved the flavor of low alcohol beers, but, in low concentrations, increased the smoothness and improved the flavor stability of a wide variety of malt beverages. Aspartame also imparted "body" or mouth feel to low calorie beers, although the Aspartame added no calories and its dosage was measured in terms of parts per million, much too low to affect the specific gravity of malt beverages. It was found that Aspartame, at concentrations below 10 ppm, where sweetness was barely or not detectable, i.e., where sweetness is at or near the threshold of detection, could reduce the tart or astringent flavor component of low calorie ("Light") beers, which typically contain a higher alcohol to carbohydrate ("extract") ratio then those of lagers or ales.

DESCRIPTION OF THE PREFERRED EMBODIMENTS

In the preferred application of this invention, a malt beverage is prepared in the desired manner, and the beverage stream is dosed with a stock solution of Aspartame at least after the boiling operation, and preferably after final filtration. A practical concentration of the Aspartame stock solution is in the range of 0.1 to 1.0 percent (1,000–10,000 ppm) in order to obtain levels of 5–15 ppm in the finished beer.

The addition of Aspartame is particularly applicable to beers of low original gravity, which may have been fermented to a lower or higher degree of attenuation than the 62–68 percent normal for lager types.

Various beer types are compared with regular lager (#3) in Table I.

TABLE I

| Typical Analysis of Various Beer Types | | | | | | | |
| --- | --- | --- | --- | --- | --- | --- | --- |
| TYPE | #1 | #2 | #3 | #4 | #5 | #6 | #7 |
| Real Degree of Atten. | 40 | 51.5 | 62 | 66 | 72 | 72 | 85 |
| Original Gravity, °P. | 7.5 | 13.0 | 10.5 | 12.0 | 8.0 | 7.2 | 8.65 |
| Real Extract, °P. | 4.2 | 6.3 | 4.0 | 4.5 | 2.4 | 1.8 | 1.25 |
| Alcohol, % wt./wt. | 1.8 | 3.5 | 3.6 | 3.9 | 2.8 | 2.4 | 3.90 |
| Kcal/12 oz. | 100 | 175 | 140 | 160 | 95 | 84 | 113 |

The aforementioned beer types are those well known in the art and generally consist of a fermented malt beverage made from water, malt, hops and yeast, and, in some cases, also cereal adjunct and/or fruit flavoring, with or without minor constituents such as water treatment salts, yeast food, etc.

The flavor effects of various added concentrations of Aspartame may be judged from the following experiment. Five beer samples, similar to type #5, but containing 0, 2, 4, 8 and 16 ppm Aspartame were presented to a trained taste panel in random order. Seven of the ten panel members correctly identified the 16 ppm sample as the sweetest and five of the ten correctly identified the 16 ppm sample as being higher in body. Three of the seven properly identified the sample containing 8 ppm as the second strongest using the criteria of both sweetness and body. Three panel members indicated that the 16 ppm dosage was overwhelmingly sweet.

The use of Aspartame as a flavor modifier for malt beverages is illustrated but not limited by the following examples:

EXAMPLE 1

A low-alcohol beer, similar to type #1 of Table I, having an original gravity of 7.0° Plato and an alcohol content of 1.89% w/w was treated with 10 ppm Aspartame. A trained panel of twenty-two tasters preferred the treated beer by an 18 to 4 margin. Flavor profile comments were analyzed according to two-tailed binomial tables for total number of responses. These indicated that the treated beer was not only perceived as more sweet (90% confidence level), but also as smoother and less afterbitter at the same confidence level, and as less astringent at the 95% confidence level.

EXAMPLE 2

A low-calorie beer, similar to type #6 of Table I, having an original gravity of 7.2° P and an alcohol content of 2.64% w/w was treated with 6 ppm Aspartame, and submitted to the same panel. The flavor comments were analyzed statistically as above, and the treated beer was found to be less astringent at the 90% confidence level. Sweetness was noted by several tasters, but the number failed to meet the 90% criterion.

EXAMPLE 3

The low-calorie beer of Example 2 was tasted again after 60 days of storage at room temperature. Twelve of the fifteen panel members preferred the treated beer and found it to exhibit more body at the 95% confidence level and perceived it to be sweeter, though only directionally so. The treated beer showed significantly more positive flavor attributes (fresh, smooth, good hop aroma) at the 95% confidence level, than the untreated beer. Many tasters also noted a slightly fuller taste in the treated beer.

EXAMPLE 4

A low-calorie beer, somewhat similar to type #5 of Table I, having an original gravity of 9° P and an alcohol content of 3.3% w/w was treated with 6 ppm Aspartame and tasted after 60 days of storage at room temperature. Twenty-two trained panel members compared the treated beer with an untreated control in a random and blind presentation.

| Number of Tasters Who Judged The Treated Beer To Be: | | | | |
|---|---|---|---|---|
| | More Than | Less Than | Equal To | Statistical Significance |
| Sweet | 10 | 3 | 9 | — |
| Smooth | 14 | 2 | 6 | 90% |
| Oxidized, aged | 3 | 14 | 5 | 90% |
| Astringent | 2 | 16 | 4 | 90% |

The preference for the Aspartame-treated beer was 17:5 (95% significance). Quality was scored on a 9-point hedonic scale, from 1=undrinkable to 9=excellent. The control beer was rated 3.5, being no longer fresh. Treatment with 6 ppm Aspartame increased the quality score to 4.6.

EXAMPLE 5

Domestic lager, similar to types #3 and #4 of Table I, having an original gravity of 11.0° P and an alcohol content of 3.65% w/w with 6 ppm Aspartame was submitted to the same taste panel. The results were analyzed statistically as above. The trained panel of twenty tasters preferred the treated beer upon arrival by a margin of 14 to 6 with quality ratings of 5.5 to 5.1, respectively. The flavor profile of these beers show that the treated beer was perceived as less astringent at the 90% confidence level. Several tasters noted that the treated beer was also sweeter and slightly less afterbitter, although statistical significance was not attained for these flavor attributes.

EXAMPLE 6

A fruit-flavored malt beverage similar to type #7 having an original gravity of 8.6° P, an alcohol content of 3.9% w/w and 115 calories/12 oz. was treated with 450 ppm Aspartame and evaluated by a small select panel of trained tasters against a similarly flavored malt beverage sweetened with 7.1% high fructose corn syrup. This, on a dry basis, produced an original gravity of 16° P and 215 calories/12 oz. The two products were judged to be very similar in sweetness, with the Aspartame product having 100 fewer calories per 12 oz. serving.

EXAMPLE 7

An all-malt lager beer similar to type #4, having an original gravity of 12.0° P and an alcohol content of 4% w/w and 160 calories was treated with 20 ppm Aspartame and compared by a trained panel of thirteen to the same beer without Aspartame. The treated beer was judged to be both sweeter (5:3) and smooth (5:1), with less afterbitterness (1:6). Preference was equally divided, indicating that sweetness was at the maximum acceptable level for a traditional lager.

| Number of Tasters Who Judged The Treated Beer To Be: | | | |
|---|---|---|---|
| | More Than | Less Than | Equal To |
| Sweet | 6 | 1 | 6 |
| Smooth | 5 | 1 | 7 |
| Afterbitter | 0 | 6 | 7 |

EXAMPLE 8

A regular lager beer similar to type #3, having an original gravity of 10.5° P and alcohol content of 3.6% w/w, with 140 calories, was treated with 4 ppm Aspartame and compared to the same beer without the Aspartame addition. A trained panel of eleven members preferred the Aspartame-treated beer 8:3, judging it smoother, sweeter, less oxidized, and less astringent.

| Number of Tasters Who Judged The Treated Beer To Be: | | | |
|---|---|---|---|
| | More Than | Less Than | Equal To |
| Sweet | 4 | 2 | 5 |
| Smooth | 5 | 0 | 6 |
| Oxidized | 2 | 6 | 3 |
| Astringent | 1 | 4 | 6 |

I claim:
1. A method of modifying a malt beverage to improve the flavor and flavor stability of the same by the addition of aspartame thereto without sweetening said malt beverage comprising the steps of:
    (1) brewing a malt beverage to produce a carbonated fermentation product made from ingredients including water, malt, hops and yeast, and
    (2) at least after the boiling operation in the brewing of said malt beverage, adding aspartame to the malt beverage in an amount to produce a concentration of the same in the final product between predetermined minimum and maximum concentrations respectively ranging in any event between about four parts per million and about ten parts per million of the final product, said minimum and maximum concentrations being further determined by brewing industry standardized taste testing procedures so as to detect at said minimum concentration with at least about a 90% confidence level a noticeable preferential taste change in the final product compared to the same product without addition of aspartame in at least the following defined sensory characteristic (a) and in one or more of the following additional defined sensory characteristics (b) through (e):

(a) less of an aged or oxidized taste to thereby improve the stability of the flavor of the final product after packaging,
(b) smoother,
(c) less astringent,
(d) more body or mouthfeel,
(e) less afterbitter, said maximum concentration being established by detection via said taste testing procedures for the characteristics of sweetness in the final product to ascertain the concentration where sweetness is barely or not detectable, whereby said addition of said amount of aspartame to said malt beverage results in a substantial improvement in the flavor and stability of such flavor in the final product without producing a detectable change in said malt beverage characterized by sweetness, said maximum concentration in any event being no more than about ten parts per million and being less than about ten parts per million as required to achieve the aforesaid taste detected maximum concentration.

2. The method as set forth in claim 1 wherein said aspartame is added after final filtration in the brewing of said malt beverage.

3. The method as set forth in claim 1 wherein the minimum and maximum concentrations are selected between said minimum and maximum concentrations to modify said malt beverage to an extent sufficient to detect a noticeable preferential taste change in a majority of said characteristics at or above the 90% confidence level.

4. The method set forth in claim 1 wherein said brewing step is performed in a manner and with ingredients such as to produce a low-alcohol beer, and said aspartame addition step is performed by addition of aspartame in an amount at or near said first upper limit maximum concentration of about ten parts per million.

5. The method as set forth in claim 1 wherein said brewing step is performed in a manner and with ingredients to produce a low-calorie beer, and said aspartame addition step is performed by addition of aspartame in an amount of about six parts per million of the final product.

6. The method as set forth in claim 1 wherein said aspartame addition step is performed by the addition of aspartame in an amount of about six parts per million of the final product.

7. The method as set forth in claims 1, 2, or 3 wherein said brewing step is performed in a manner and with ingredients to produce a regular lager beer.

8. An unsweetened malt beverage modified to improve the flavor and flavor stability of the same by the addition of aspartame thereto comprising a carbonated fermentation product made by brewing of ingredients including water, malt, hops, cereal adjunct and yeast and containing between about 1.8% and 3.9% weight/weight alcohol, an original gravity between about 7.2° P and 13.0° P, a calorie content per twelve ounce volume of between about 84 and 175, a real extract content of between about 1.25° P and 6.3° P and a real degree of attenuation of between about 40 and 85, said malt beverage containing aspartame in dissolved form in a concentration amount ranging between minimum and maximum concentration limits of about four and ten parts per million respectively of the final product, said concentration amount being determined in said range by brewing industry standardized taste testing procedures in any event to be high enough to modify said malt beverage to an extent sufficient to detect a noticeable preferential taste change in the final product with respect to at least a majority of the following sensory characteristics with at least about a 90% confidence level as compared to the same product without addition of aspartame;

(a) less of an aged or oxidized taste to thereby improve the stability of the flavor of the final product during aging after packaging,
(b) smoother,
(c) less astringent,
(d) more body or mouthfeel, and/or
(e) less afterbitter, said concentration amount being in any event low enough in said range as established by detection via said taste procedures for the characteristic of sweetness in the final product to insure that sweetness is barely or not detectable, whereby said addition of said concentration amount of aspartame to said malt beverage results in a substantial improvement in the flavor and stability of such flavor in the final product without producing a change in said malt beverage characterized by sweetness.

9. The malt beverage as set forth in claim 8 wherein said beverage comprises a low-alcohol beer having an alcohol content of less than about 1.9% weight/weight, said aspartame being present in an amount at or near said maximum concentration.

10. The malt beverage as set forth in claim 8 wherein said beverage comprises a low-calorie beer having a concentration of aspartame of about six parts per million of the final product.

11. The malt beverage as set forth in claim 8 wherein said beverage comprises a regular lager beer having an aspartame concentration of about six parts per million of the final product.

* * * * *